(12) United States Patent
Kim et al.

(10) Patent No.: US 7,552,886 B2
(45) Date of Patent: Jun. 30, 2009

(54) DOUBLE DRAG, PRE-SET ADJUST AND UNITARY END ASSEMBLY FOR TROLLING REEL

(75) Inventors: Hogun Kim, Tulsa, OK (US); Hyunkyu Kim, Broken Arrow, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 0 days.

(21) Appl. No.: 11/775,416

(22) Filed: Jul. 10, 2007

(65) Prior Publication Data

US 2009/0014573 A1    Jan. 15, 2009

(51) Int. Cl.
    *A01K 89/01* (2006.01)
(52) U.S. Cl. ........................ 242/246; 242/257
(58) Field of Classification Search ................. 242/249, 242/255, 257, 246, 244; D22/140
    See application file for complete search history.

(56) References Cited

U.S. PATENT DOCUMENTS

| | | | |
|---|---|---|---|
| 3,974,977 A | 8/1976 | Kamikawa | |
| 3,993,267 A | 11/1976 | Murvall | |
| 4,056,246 A | 11/1977 | Purcell | |
| 4,130,251 A | 12/1978 | Findley | |
| 4,133,499 A | 1/1979 | Purcell | |
| 4,402,469 A | 9/1983 | Stiner | |
| 4,434,951 A | 3/1984 | Nakajima | |
| 4,474,341 A | 10/1984 | Shackelford et al. | |
| 4,546,937 A | 10/1985 | Hideo | |
| 4,572,454 A | 2/1986 | Furomoto | |
| 4,634,079 A | 1/1987 | Furomoto | |
| 4,650,135 A | 3/1987 | Nakajima | |
| 4,723,727 A | 2/1988 | Weber | |
| 4,742,974 A | 5/1988 | Furomoto | |
| 4,871,126 A | 10/1989 | Myojo et al. | |
| D310,116 S | 8/1990 | Effinger | |
| 5,058,447 A | 10/1991 | Ikuta | |
| 5,161,750 A | 11/1992 | Hitomi | |
| 5,193,763 A * | 3/1993 | Sakaguchi | 242/255 |
| 5,205,511 A | 4/1993 | Morimoto | |
| 5,257,753 A | 11/1993 | Sato | |
| 5,273,235 A | 12/1993 | Sato | |
| 5,297,756 A | 3/1994 | Ikuta | |
| D347,046 S | 5/1994 | Sakurai | |
| D348,919 S | 7/1994 | Sato et al. | |
| D353,647 S | 12/1994 | Sakurai | |
| D356,138 S | 3/1995 | Onishi | |
| 5,497,953 A | 3/1996 | Betto et al. | |
| D369,642 S | 5/1996 | Iwabuchi | |
| 6,045,075 A | 4/2000 | Iwabuchi et al. | |
| 6,102,316 A * | 8/2000 | Nilsen | 242/255 |
| 6,113,019 A | 9/2000 | Jewell | |
| 6,196,485 B1 | 3/2001 | Sato | |
| D451,576 S | 12/2001 | Datcuk, Jr. et al. | |

(Continued)

OTHER PUBLICATIONS

Abu Garcia, Photographs of Abu Garcia's Ambassadeur reel, publication date unknown.

*Primary Examiner*—Emmanuel M Marcelo
(74) *Attorney, Agent, or Firm*—Fellers, Snider, Blankenship, Bailey & Tippens

(57) ABSTRACT

A heavy duty fishing reel or trolling reel is disclosed having improvements related to a unitary end assembly, a duel drag system, a preset adjust mechanism and anti-bind improvements.

6 Claims, 7 Drawing Sheets

U.S. PATENT DOCUMENTS

| | | |
|---|---|---|
| D451,577 S | 12/2001 | Duarte |
| 6,412,720 B1 | 7/2002 | Ikuta |
| 6,460,793 B1 | 10/2002 | Hirayama et al. |
| 6,634,586 B1 | 10/2003 | Chang |
| 6,830,208 B2 | 12/2004 | Datcuk, Jr. |
| 6,915,974 B2 | 7/2005 | Kawasaki |
| 6,997,409 B1 * | 2/2006 | Bledsoe et al. ............... 242/257 |
| 7,017,845 B2 | 3/2006 | Clark |
| 7,070,139 B2 | 7/2006 | Nakagawa et al. |

* cited by examiner

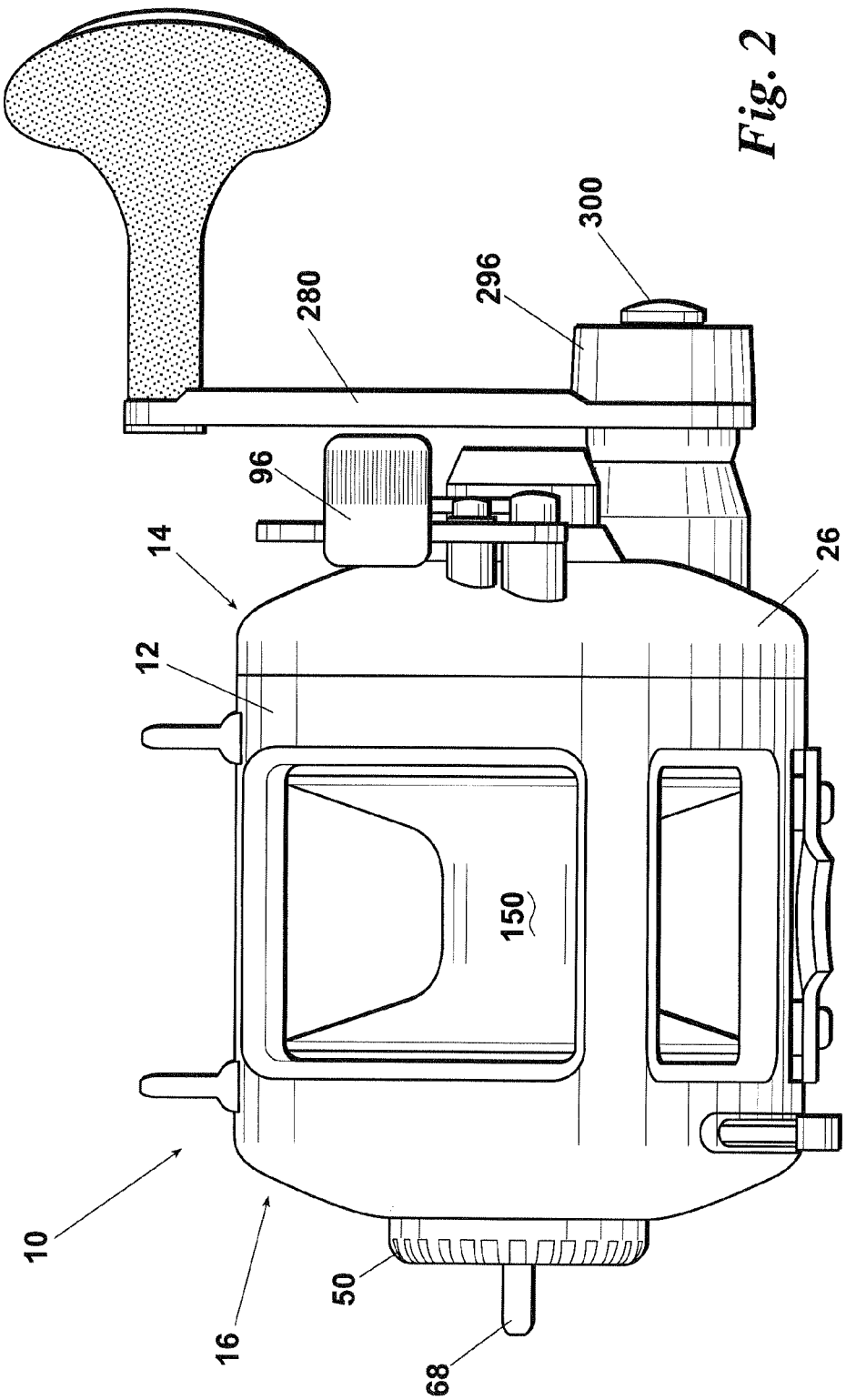

DOUBLE DRAG, PRE-SET ADJUST AND UNITARY END ASSEMBLY FOR TROLLING REEL

FIELD OF THE INVENTION

The invention relates to heavy duty fishing reels. In particular, the invention relates to improvements for trolling reels including end assembly, drag system, preset adjust and anti-bind improvements.

BACKGROUND OF THE INVENTION

Saltwater fishing tackle is typically substantial to withstand the stresses imposed by landing large fish. Heavy duty components are typically employed, such as a ceramic drag system, brass alloy gears, ceramic drag discs, and a protective finish to guard against salt water corrosion.

Improved functionality and durability are desirable for heavy duty saltwater reels.

SUMMARY OF THE INVENTION

A heavy duty trolling reel is disclosed having improved features including an improved pre-set adjust, an attractive and functional unitary end that performs various interface functions, a double drag mechanism, a floating gear system to prevent binding of mechanisms, and a quickly adjustable two-speed mechanism.

An annular pre-set knob is provided with a knurled exterior surface for gripping by a user. The annular pre-set knob may be depressed by a user to engage pre-set knob pins extending from the pre-set knob with an orifice defined by a face of a first pre-set gear. Therefore, first pre-set gear may be rotated by depressing and rotating the annular pre-set knob. The first pre-set gear, in turn, engages a pre-set idle gear for rotating a second pre-set gear, which is threadably received on a spool shaft. Rotation of second pre-set gear moves second pre-set gear longitudinally along the threaded portion of the spool shaft for pressing a left drag plate assembly against a smooth portion of the bait click ratchet plate. A spool assembly and attached second drag washer are also pressed into contact with a right drag plate assembly, thereby facilitating frictional resistance on both sides of the spool, i.e., facilitating "double drag."

A clamp nut is located inside of the annual pre-set knob and is substantially flush with an exterior of the annular pre-set knob. The clamp nut has an interior portion that threadably engages an end of the spool shaft. The clamp nut has an exterior side that defines a shaped recessed area for receiving a hinged retractable handle. The hinged retractable handle is preferably flush with an exterior of the clamp nut when the hinged retractable handle is in a closed position. By unfolding the hinged retractable handle to an open position, a user may use the handle to rotate the clamp nut to unscrew the clamp nut off of the end of a spool shaft, thereby enabling the reel to be disassembled, i.e., enabling a gear side cover to be removed, thereby exposing the interior of the reel.

A low speed pinion gear is mounted on the spool shaft and is received within a right shaped receptacle of the right drag plate assembly. A high speed pinion gear is also mounted on the spool shaft and is sized to be received within the low speed pinion gear. The high speed pinion gear is received within the right shaped receptacle of the right drag plate assembly. The high speed pinion gear has a cylindrical extension on a right end. The high speed pinion gear has an inner diameter sized to allow for a gap of preferably 0.2 mm between the inner diameter of the high speed pinion gear and the spool shaft. A ball bearing assembly surrounds the cylindrical extension of the high speed pinion gear. The ball bearing tightly engages a bearing pocket on an outer diameter of the ball bearing and tightly engages the high speed pinion gear on an inner diameter of the ball bearing. The bearing pocket is provided for receiving the ball bearing. The bearing pocket is tightly received within a central orifice of the gear side cover. The bearing pocket tightly engages the spool shaft on an inner diameter and tightly engages the gear side cover on an outer diameter. The gap between selected components or "floating gear system" reduces the chances for seizing of the mechanism over the life of the reel.

A low speed drive gear surrounds the crank shaft. The low speed drive gear is located to selectively engage a low speed pinion gear. The low speed drive gear has a shaped receptacle on the left side for receiving the shaped exterior of a gear shifting plate. A first spacer is provided for locating on an internal end of the crank shaft. The first spacer has a protuberance for locating in a longitudinal notch of the crank shaft. A second spacer surrounds the crank shaft. A crank shaft nut is threadably received on an internal end of the crank shaft. A gear shifting plate spring is received in shaped exterior end of the crank shaft. A shifting pin is received within the shaped exterior of the crank shaft. A shifting pin is biased exteriorly by a gear shifting plate spring. The shifting pin is threadably engaged with the gear shifting plate, which acts to bias the gear shifting plate and the attached low speed drive gear in an exterior direction for disengaging the low speed drive gear from the low speed pinion gear. A bushing is located adjacent a shifting pin. A gear shifting spring is located adjacent the bushing. By depressing a low speed shift button on the crank handle assembly, either the high speed drive gear or the low speed drive gear will interface with the corresponding high speed or low speed pinion gear, as desired. The two speed system described above allows for a user to reel in line in a low gear mode, suitable for reeling in large fish, or a high gear mode, suitable for reeling in fishing line at an increased speed.

As can be seen from the above description, the reel of the invention is provided with improvements that improve functionality and durability.

BRIEF DESCRIPTION OF THE DRAWINGS

FIG. 2 is a front elevation view of the trolling reel of FIG. 1;

DETAILED DESCRIPTION OF THE PREFERRED EMBODIMENTS

Figure 1A:
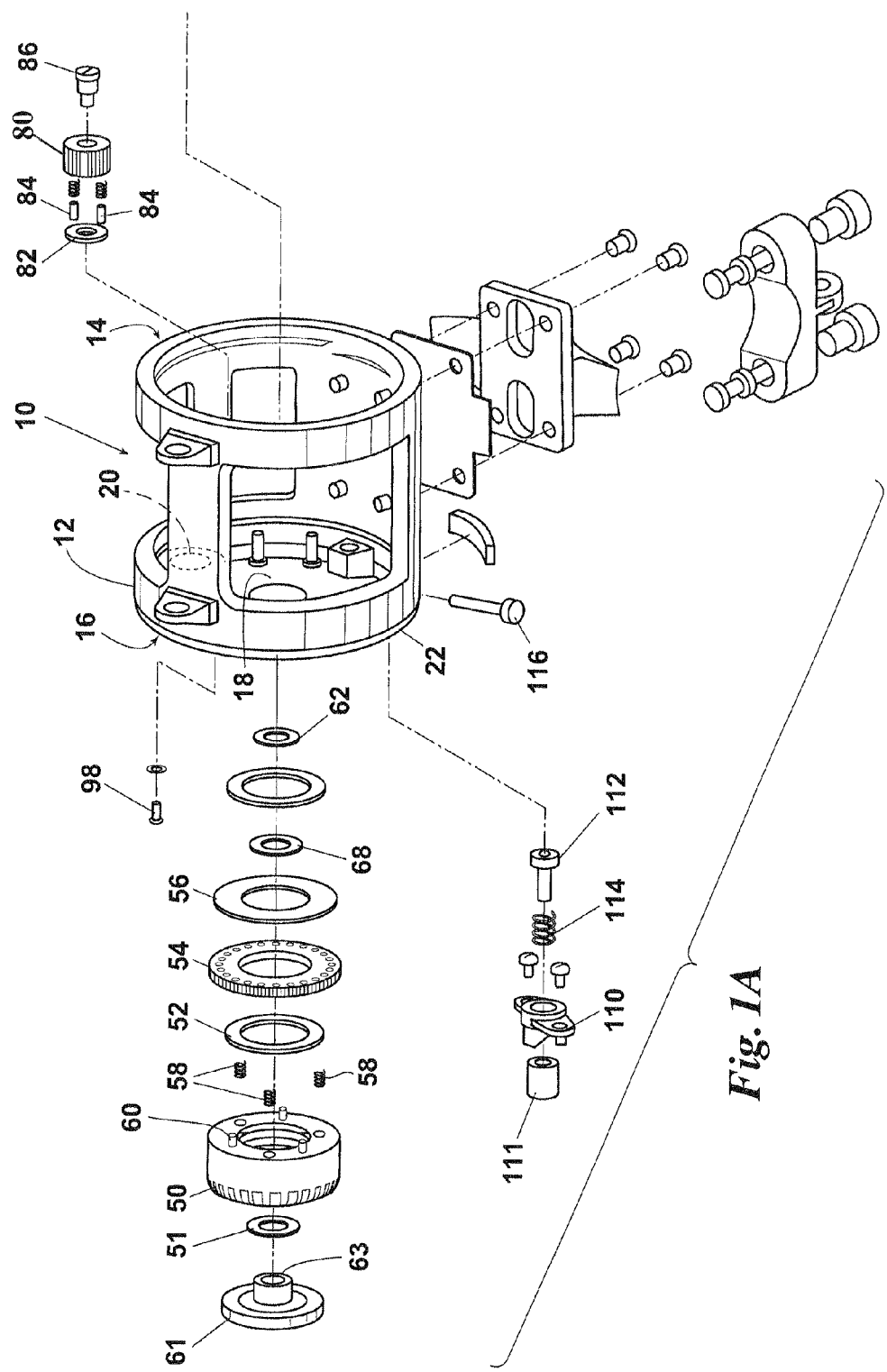
FIG. 1A-C is an exploded view of the trolling reel of the invention.

A trolling reel 10 includes a frame assembly 12 having a substantially open end 14 and a substantially closed end 16. Closed end 16 defines a central orifice 18. Substantially closed end 16 defines a cavity 20 on an inside surface. Substantially open end 14 is provided with a mating surface 22.

A gear side cover 26 (FIGS. 1C, and 2-5) is removably affixed to substantially open end 14. Gear side cover 26 defines a central orifice 28 and a crank shaft orifice 30 therein.

An annular pre-set knob 50 is located proximate to said central orifice 18 of substantially closed end 16 of frame assembly 12. Pre-set knob 50 preferably is provided with a knurled exterior surface for gripping by a user. A pre-set gear washer is located adjacent an interior surface of annular pre-set knob 50. A first pre-set gear 54 (FIG. 1) is received within central orifice 18 of substantially closed end 16 of frame assembly 12 and is located behind annular pre-set knob 50. First pre-set gear 54 has external gear teeth and defines a plurality of orifices around a face of first pre-set gear 54. A pre-set gear washer is located adjacent to an interior side of first pre-set gear 54. A plurality of pre-set knob springs 58 is located between annular pre-set knob 50 and first pre-set gear 54 for biasing the annular pre-set knob 50 away from the first pre-set gear 54. Three pre-set knob pins 60 extend rearwardly from first pre-set gear 54. Pre-set knob pins 60 are provided for selective engagement with one of the plurality of orifices around the face of first pre-set gear 54. Pre-set knob pins 60 engage the orifices of first pre-set gear 54 when pre-set knob 50 is depressed, thereby compressing pre-set knob springs 58.

Figure 6:
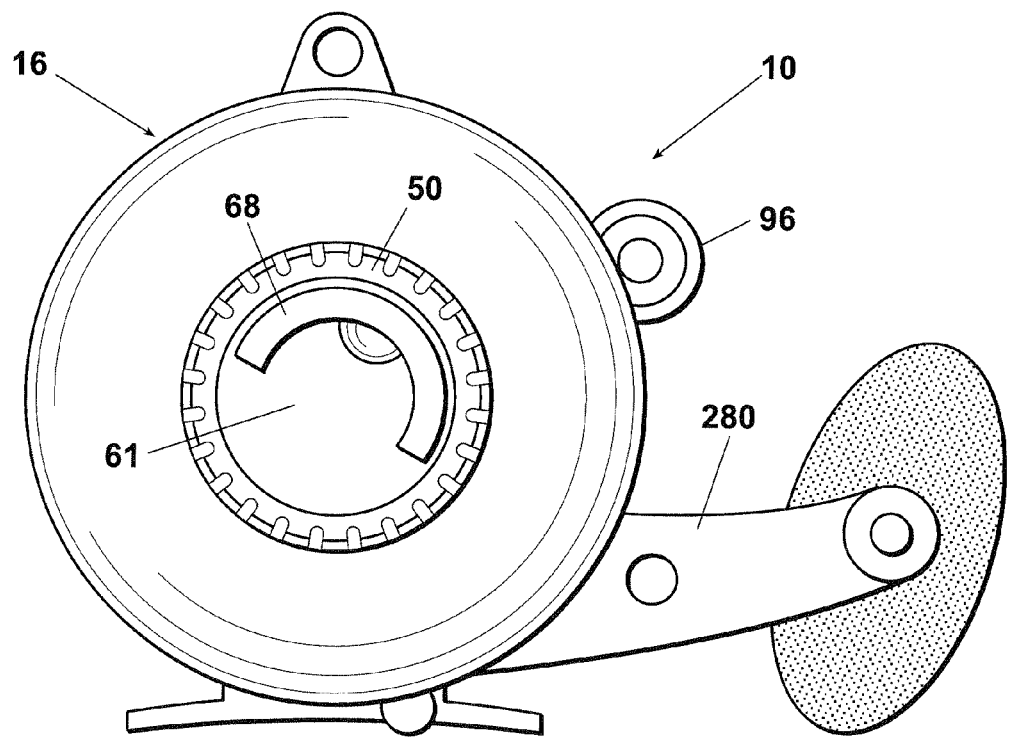
FIG. 6 is a left side elevation view of the trolling reel of FIG. 1.

Clamp nut 61 (FIGS. 1A and 6) is received in the central orifice 18 of substantially closed end 16 of frame assembly 12 inside of annular pre-set knob 50. Clamp nut 61 has an interior end and an exterior end. The interior end of clamp nut 61 defines an internally threaded extension 63. After installation, the exterior end of clamp nut 61 is visible to a user (see FIG. 6). Clamp nut retainer 62 secures the clamp nut washer, pre-set knob 50, pre-set knob spring 58, the second pre-set gear washer, first pre-set gear 54, first pre-set gear washer, and a clamp nut washer onto internally threaded extension 63 of clamp nut 61. Clamp nut 61 is provided with a pivoting handle 68 that may be extended for use by a user or may be retracted into a shaped receptacle to create a flush exterior. Pivoting handle 68 is provided to allow a user to rotate clamp nut 61.

Figure 1B:
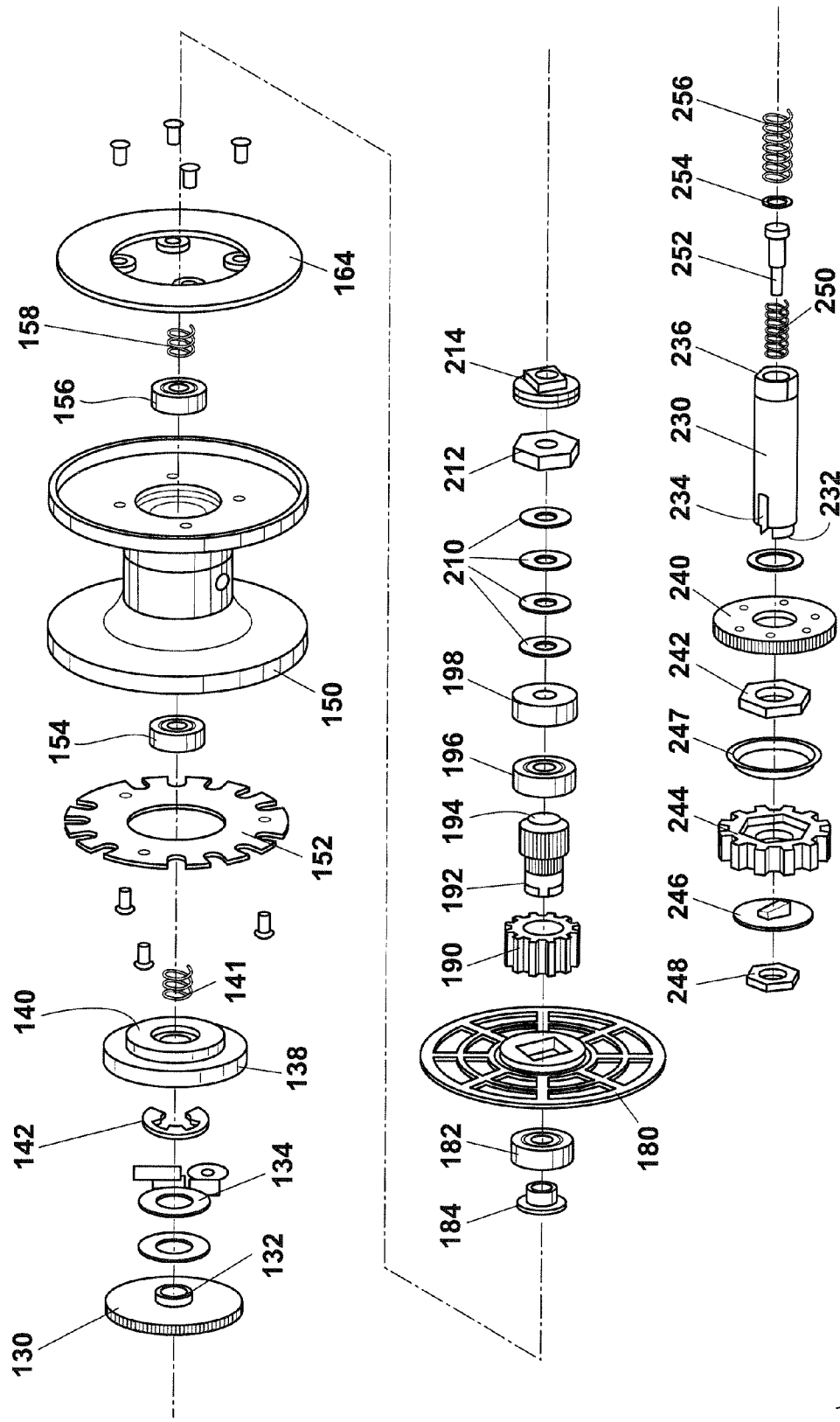
Figure 1C:
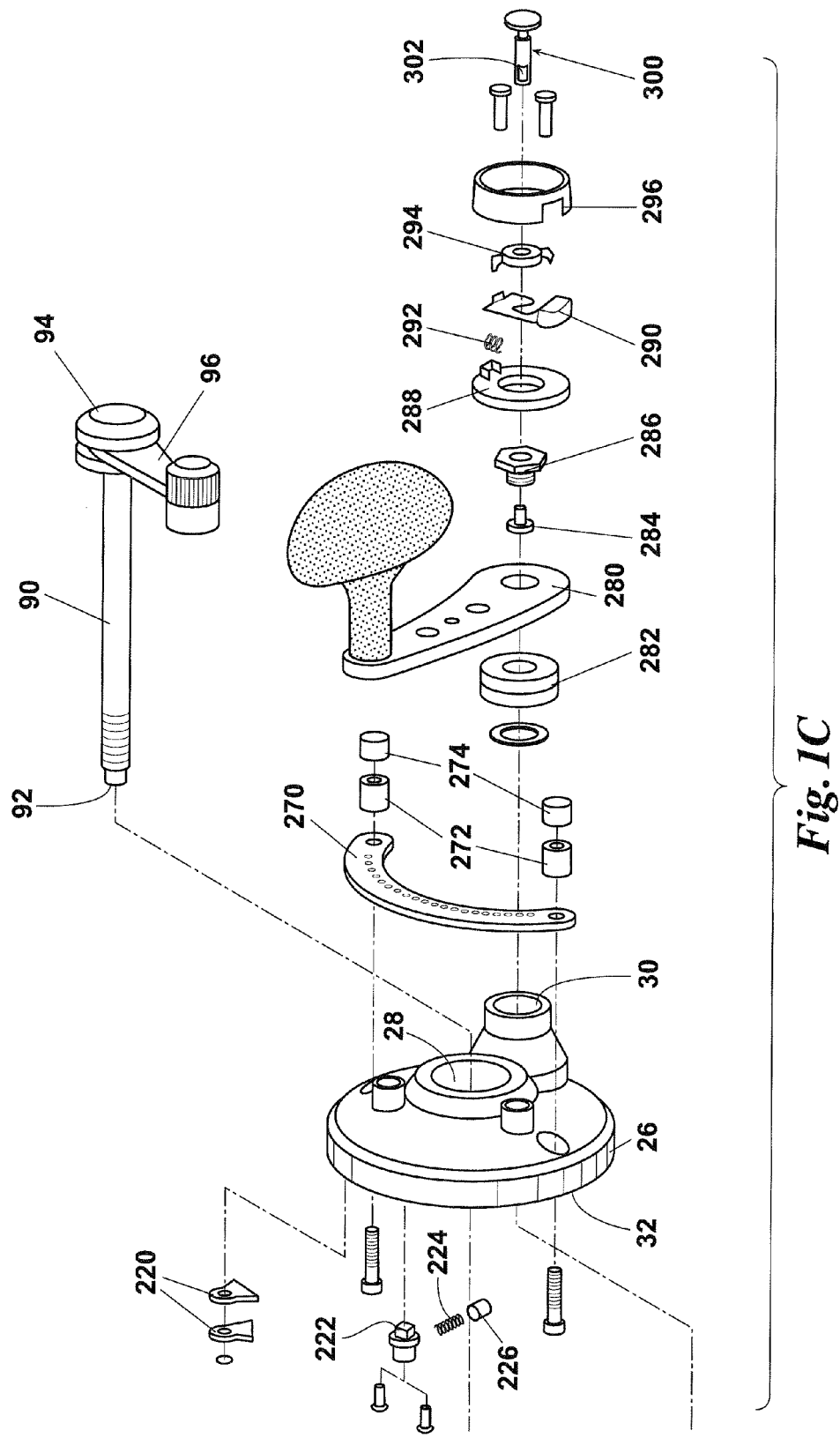
Figure 3:
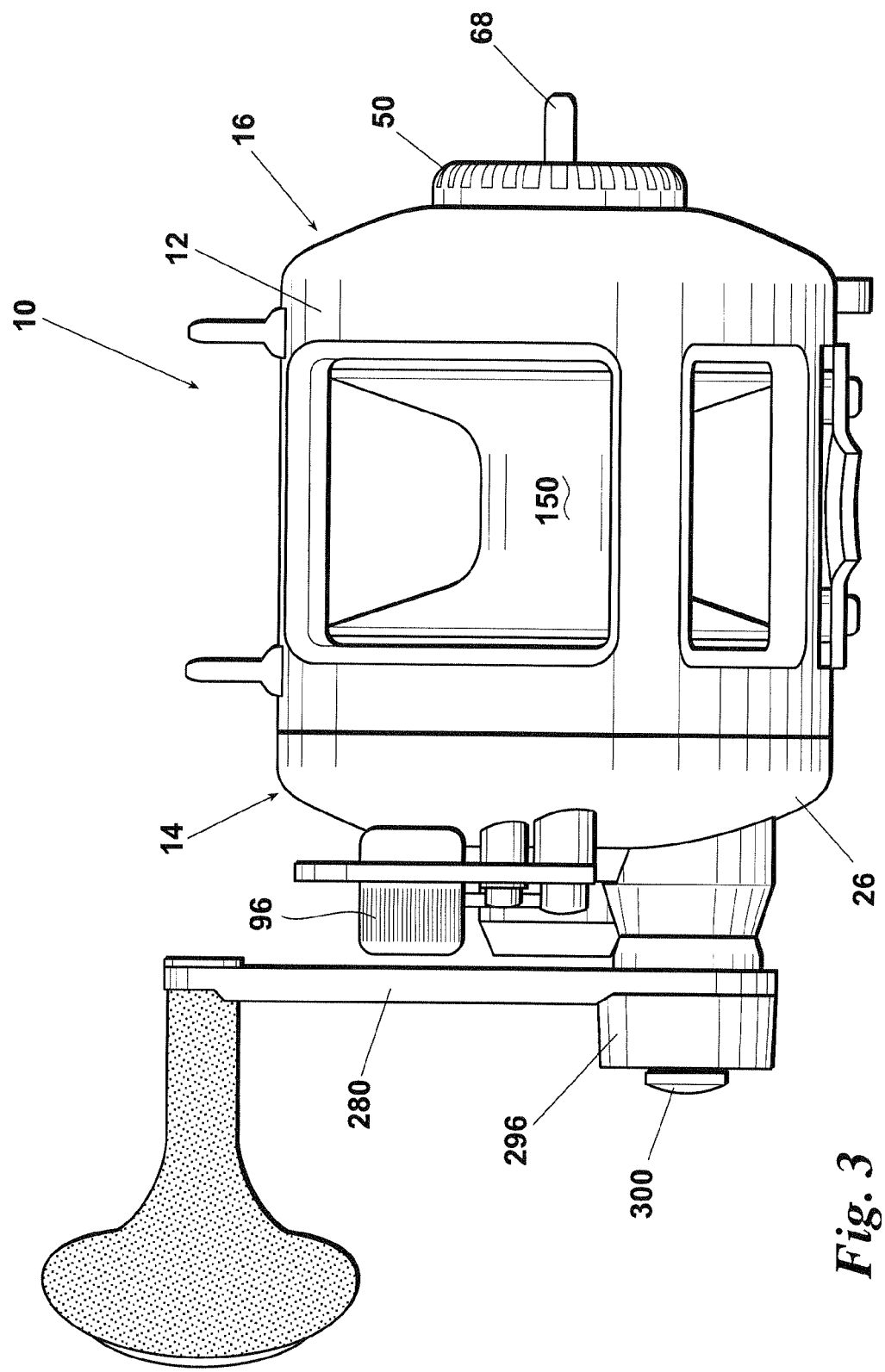
FIG. 3 is a rear elevation view of the trolling reel of FIG. 1.
Figure 4:
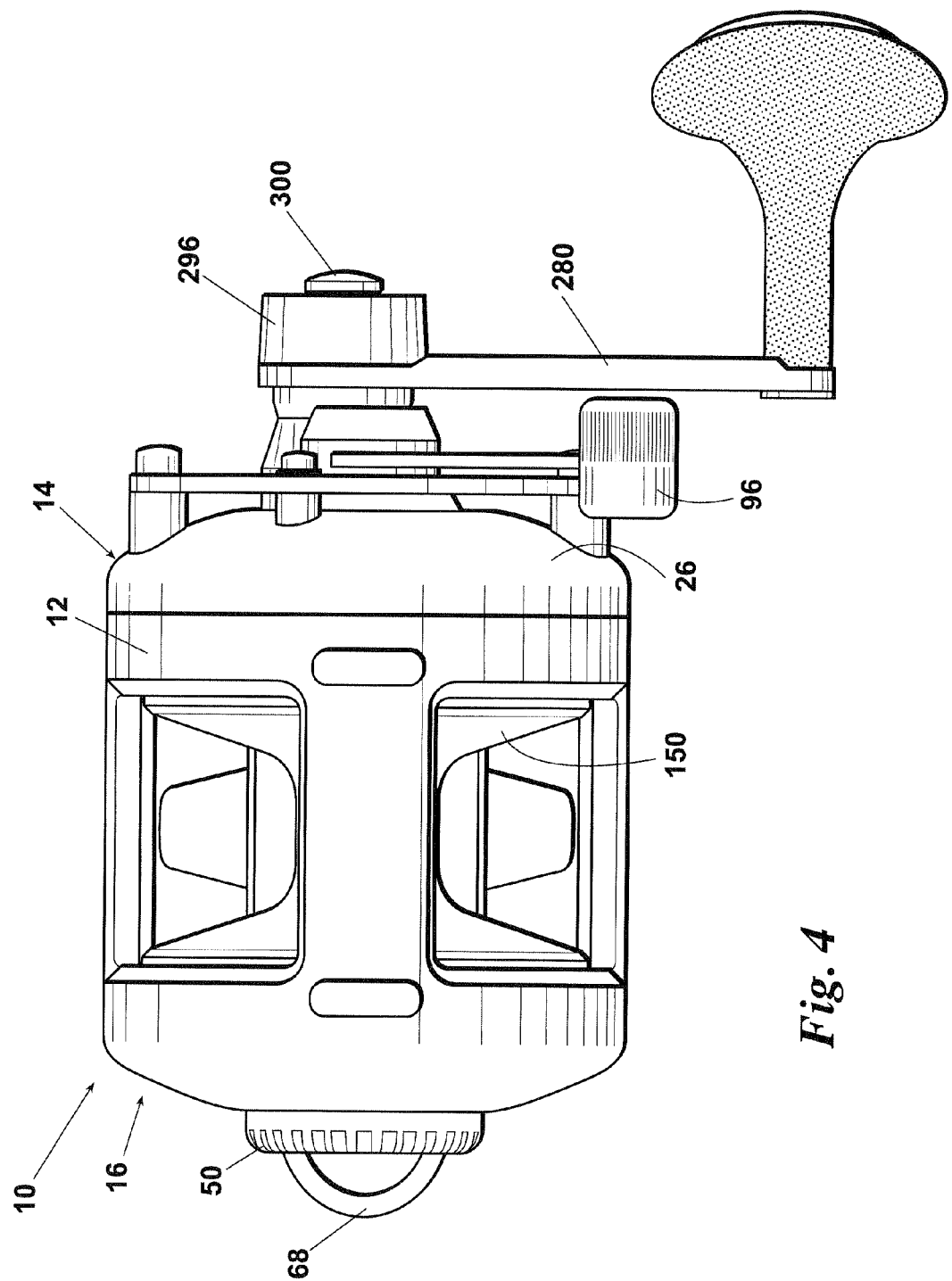
FIG. 4 is a top plan view of the trolling reel of FIG. 1.
Figure 5:
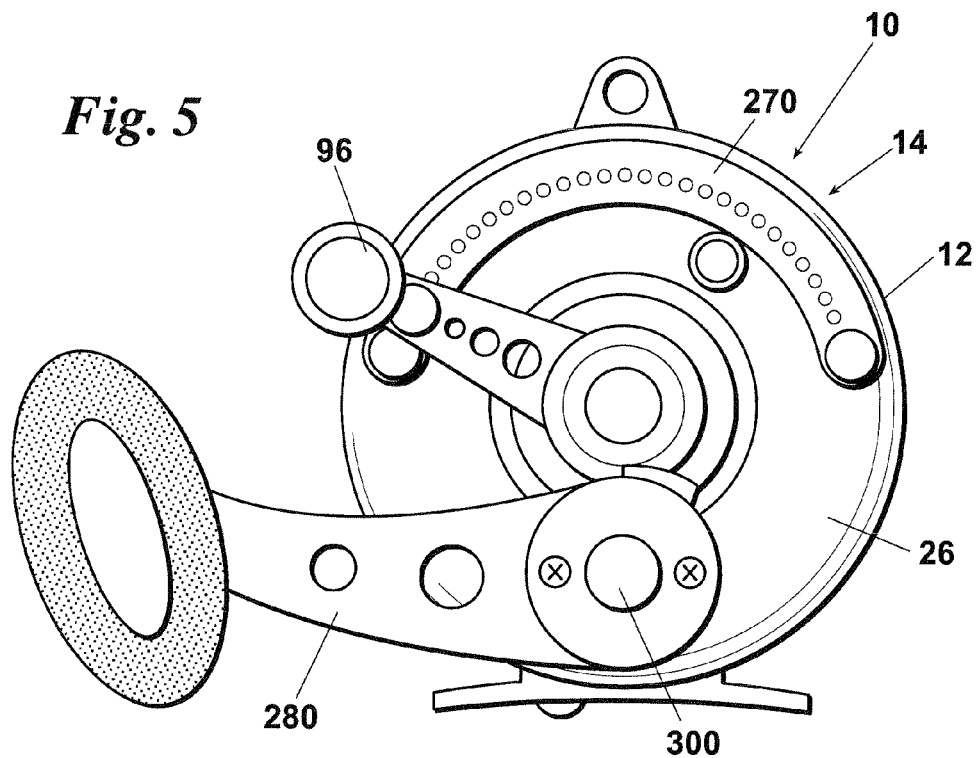
FIG. 5 is a right side elevation view of the trolling reel of FIG. 1.

A pre-set idle gear 80 engages the external teeth of first pre-set gear 54. Pre-set idle gear 80 is driven by first pre-set gear 54 for driving second pre-set gear 130 (FIG. 1B). A left end of pre-set idle gear 80 defines a pair of receptacles. Pre-set idle gear click plate 82 is located in cavity 20 defined by the inside surface of substantially closed end 16 of frame assembly 12. A portion of a bottom of cavity 20 is open to allow for interface of first pre-set gear 54 and pre-set idle gear 80. Pre-set idle gear click plate 82 is adjacent to a left end of pre-set idle gear 80. A spring biased pre-set idle gear click pin 84 is located in the receptacle of pre-set idle gear 80. The pre-set idle gear click pin 84 is provided for moving with the pre-set idle gear 80 and for engaging pre-set idle click plate 82. Pre-set idle gear screw 86 is provided for securing the pre-set idle gear 80 to the inside surface of the substantially closed end 16 of frame assembly 12.

A spool shaft 90 (FIG. 1C) has a first end 92 that is threadably received within internally threaded extension 63 of clamp nut 61. Spool shaft 90 additionally has a second end 94 affixed to spool shaft lever or handle 96 that is external gear side cover 26.

A bait click cam 110, 111 (FIG. 1A) is secured to an inside surface of substantially closed end 16 of frame assembly 12. A bait click pawl 112 is in communication with bait click cam 110 wherein bait click cam 110 selectively forces the bait click pawl 112 into communication with a bait click ratchet 152 (FIG. 1B). A bait click spring 114 is provided for biasing bait click pawl 112 toward bait click ratchet 152. A bait click lever 116 protrudes from the body of frame assembly 12 to allow a user to manually rotate bait click cam 110, 111.

Second pre-set gear 130 is threadably received on spool shaft 90. Second pre-set gear 130 has external gear teeth that engage pre-set idle gear 80. Second pre-set gear 130 has an inwardly extending stem 132. Rotation of second pre-set gear 130 moves second pre-set gear 130 longitudinally along spool shaft 90. Drag stopper plate assembly 134 is located on stem 132 of second pre-set gear 130. A drag stopper plate washer is provided between second pre-set gear 130 and drag stopper plate assembly 134. A left drag plate assembly 138 is located adjacent to an internal face of second pre-set gear 130. Left drag plate assembly 138 surrounds stem 132 of second pre-set gear 130. Left drag plate assembly 138 has a raised portion 140 on a right face of left drag plate assembly 138 and a friction pad that surrounds said raised portion 140. The raised portion 140 defines a recessed area. A first pressure relief spring 141 surrounds spool shaft 90 and is received in the recessed area of raised portion 140 of left drag plate assembly 138. E-clip 142 is provided for affixing the left drag plate assembly 138 to stem 132 of second pre-set gear 130.

A spool assembly 150 is located on spool shaft 90. Spool assembly 150 has a left end and a right end. Base click ratchet plate 152 is secured to a left end of the spool assembly 150. Base click ratchet plate 152 has a smooth inner portion for rubbing against the friction pad on left drag plate assembly 138. First ball bearing assembly 154 surrounds spool shaft 90 and is located in the recessed area defined by a left end of spool assembly 150.

A second ball bearing assembly 156 surrounds spool shaft 90 and is located in a recessed area on the right end of spool assembly 150. A second pressure relief spring 158 surrounds spool shaft 90 adjacent to second ball bearing 156. A second drag washer 164 is affixed to the right side of spool 150 with a plurality of screws.

Right drag plate assembly 180 is provided with a left receptacle and a right shaped receptacle. Third ball bearing assembly 182 surrounds spool shaft 90 and is received within a receptacle of the right drag plate assembly 180. Third ball bearing assembly 182 is tightly received within a receptacle defined by right drag plate assembly 180. Bushing 184 is tightly received on an inner diameter of third ball bearing 182. Bushing 184 is installed in tight engagement with spool shaft 90.

A high speed pinion gear 192 surrounds spool shaft 90 and has a sleeve portion with a shaped end. The shaped end of high speed pinion gear 192 is received within a shaped receptacle of right drag plate assembly 180. Low speed pinion gear 190 is received on the sleeve portion of high speed pinion gear 192. High speed pinion gear 192 has an inner diameter sized to allow for a gap of preferably 0.2 mm between the inner diameter of the high speed pinion gear 192 and spool shaft 90. A fourth ball bearing 196 surrounds a cylindrical extension 194 of high speed pinion gear 192. Fourth ball bearing 196 tightly engages bearing pocket 198 on an outer diameter and tightly engages cylindrical extension 194 of high speed pinion gear 192 on an inner diameter. Bearing pocket 198 receives fourth ball bearing 196. Bearing pocket 198 tightly engages spool shaft 90 on an inner diameter and tightly engages gear side cover 26 on an outer diameter.

Four drag spring washers 210 surround spool shaft 90. Drag spring washers 210 are adjacent a left side of bearing pocket 198. Second drag cam 212 surrounds spool shaft 90 and is adjacent to a right end of right most drag spring washer 210. First drag cam 214 surrounds spool shaft 90 and is adjacent to a right end of second drag cam 212. First drag cam 214 and second drag cam 212 are provided for cooperatively expanding or contracting, depending upon the relative rotational position of second drag cam 212 with respect to first drag cam 214. First drag cam 214 has a shaped right end for engagement with a shaped right end of handle 96 (FIG. 1C) that is affixed to a right end of spool shaft assembly 90.

Anti-reverse pawl 220 (FIG. 1C) is pivotally affixed to an inside surface of gear side cover 26 for engaging low speed pinion gear 190 (FIG. 1B). An anti-reverse spring holder 222 is provided with a radial cavity. Anti-reverse spring 224 is located within said radial opening of said anti-reverse spring holder 222. An anti-reverse spring post 226 surrounds anti-reverse spring 224 and is slidably received within radial opening of the anti-reverse spring holder 222.

Crank shaft 230 (FIG. 1B) passes through crank shaft orifice 30 (FIG. 1C) of gear side cover 26. Crank shaft 230 has a threaded internal end 232 defining a longitudinal notch 234. Crank shaft 230 additionally has a shaped exterior end 236.

High speed drive gear 240 is mounted on crank shaft 230 and is located to selectively engage the high speed pinion gear 192. Gear shifting plate 242 surrounds crank shaft 230 and is located adjacent to a right side of the high speed gear drive 240. Gear shifting plate 242 has a shaped exterior and defines a threaded orifice.

Low speed drive gear 244 surrounds crank shaft 230 and is located to selectively engage low speed pinion gear 190. Low speed drive gear 244 has a shaped receptacle for receiving the shaped exterior of gear shifting plate 242. First spacer 246 is provided for locating on an internal end 232 of crank shaft 230. First spacer 246 has a protuberance for locating in longitudinal notch 234 of crank shaft 230. Second spacer 247 surrounds crank shaft 230. A crank shaft nut 248 is threadably received on internal end 232 of crank shaft 230. A gear shifting plate spring 250 is received in shaped exterior end 236 of crank shaft 230. A shifting pin 252 is received within the shaped exterior 236 of crank shaft 230. Shifting pin 252 is biased exteriorly by gear shifting plate spring 250. Shifting pin 252 is threadably engaged with gear shifting plate 242, which acts to bias gear shifting plate 242 and the attached low speed drive gear 244 an in exterior axial direction for disengaging low speed drive gear 244 from the low speed pinion gear 190. Bushing 254 is located adjacent shifting pin 252. Gear shifting spring 256 is located adjacent bushing 254.

Curved quadrant 270 (FIG. 1C) is affixed to an external side of gear side cover 26. Quadrant 270 has a first orifice proximate a first end and a second orifice proximate a second end. Quadrant spacers 272 are adjacent to the orifices of quadrant 270. Quadrant anchors 274 are adjacent to the quadrant spacers 272 for affixing quadrant 270 to gear side cover assembly 26.

A riser defines crank shaft orifice 30 on gear side cover 26. Handle assembly 280 defines an orifice for engaging the shaped exterior end 236 of crank shaft 230. Handle collar 282 is adjacent an exterior end of handle 280. Handle collar 282 defines an outwardly facing receptacle. Button screw 284 is received within the receptacle of the handle collar 282. Button screw 284 has an outwardly facing extension. Handle nut 286 is provided for threadably affixing handle 280 to crank shaft 230. Handle nut 286 has a central through-hole. Handle nut retainer 288 has a shaped interior orifice for surrounding and engaging handle nut 286. Handle nut retainer 288 further has a button receptacle and a spring backstop defining an interior surface.

High speed shift button assembly 290 is located in the button receptacle of the handle nut retainer 288. Shifting button spring 292 is located adjacent to the spring backstop of handle nut retainer 288 for biasing a high speed shift button assembly 290 radially outward from a longitudinal axis of crank shaft 230. Button cover 294 is provided for securing the high speed shift button assembly 290 to the handle nut retainer 288. Handle nut cap 296 defines a central orifice and is secured to handle assembly 280 and covers button screw 284, handle nut 286, handle nut retainer 288, shifting button spring 292, and button cover 294.

A low speed shift button 300 is inserted within the central orifice of handle nut cap 296 and through button cover 294, handle nut retainer 288, handle nut 286 and through crank shaft orifice 30 of gear side cover 26. Low speed shift button 300 has a stem 302 having a planar surface defined thereon for selective locking engagement by the high speed shifting button assembly 290. High speed shift button assembly 290 has a terminal end for engaging shift button spring 292 which biases the high speed shift button assembly 290 in an exterior direction, and for depressing shifting pin 252 which compresses gear shifting plate spring 250.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A fishing reel comprising:
a frame assembly;
a pre-set knob extending from an end of said frame assembly, said pre-set knob having an interior face;
a first pre-set gear between said pre-set knob and said frame assembly;
said pre-set knob selectively engageable with said first pre-set gear;
a spool shaft within said frame assembly, said spool shaft having a threaded end;
a second pre-set gear within said frame assembly and threaded onto said threaded end of said spool shaft;
wherein said first pre-set gear is in communication with a second pre-set gear;
wherein rotation of said second pre-set gear moves said second pre-set gear longitudinally along said threaded end of said spool shaft, thereby activating a drag mechanism.

2. The fishing reel according to claim 1 wherein:
said pre-set knob is annular and has a knurled exterior surface for gripping by a user.

3. The fishing reel according to claim 1 further comprising:
a pre-set knob pin extending from said interior face of said pre-set knob;
a spring for biasing said pre-set knob outwardly;
said first pre-set gear defining a plurality of orifices for receiving said pre-set knob pin whereby said first pre-set gear may be rotated by depressing and rotating said pre-set knob.

4. The fishing reel according to claim 1 further comprising:
a pre-set idle gear located in a cavity defined by said frame assembly such that said pre-set idle gear is inside of said frame assembly and a portion of said pre-set idle gear is accessible from an exterior of said frame assembly;
wherein said first pre-set gear engages said pre-set idle gear; and
wherein said second pre-set gear engages said idle gear.

5. The fishing reel according to claim 1 further comprising:
a spool on said spool shaft, said spool having a first end and a second end;
a drag plate assembly between said spool and said second pre-set gear, said drag plate assembly having a friction pad on a face thereof;
wherein said second pre-set gear presses said friction pad on said drag plate assembly into communication with said first end of said spool when said second pre-set gear is moved longitudinally along said threaded end of said spool shaft.

6. The fishing reel according to claim 5 further comprising:
a second drag plate assembly on said spool shaft adjacent said second end of said spool;
wherein said second pre-set gear forces said spool into frictional contact with said second drag plate assembly.

* * * * *